US012626290B2

(12) United States Patent
Chen et al.

(10) Patent No.: US 12,626,290 B2
(45) Date of Patent: May 12, 2026

(54) SYSTEM, METHOD, AND NON-TRANSITORY MACHINE-READABLE MEDIUM FOR SELF-GUIDED SEQUENCE SELECTION AND EXTRAPOLATION

(71) Applicant: Salesforce, Inc., San Francisco, CA (US)

(72) Inventors: Yongjun Chen, Palo Alto, CA (US); Zhiwei Liu, Chicago, IL (US); Jianguo Zhang, San Jose, CA (US); Huan Wang, Palo Alto, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 418 days.

(21) Appl. No.: 17/891,564

(22) Filed: Aug. 19, 2022

(65) Prior Publication Data

US 2024/0070744 A1     Feb. 29, 2024

(51) Int. Cl.
*G06Q 30/0601*     (2023.01)
*G06Q 30/0201*     (2023.01)
*H04L 67/50*     (2022.01)

(52) U.S. Cl.
CPC ..... *G06Q 30/0631* (2013.01); *G06Q 30/0201* (2013.01); *H04L 67/535* (2022.05)

(58) Field of Classification Search
CPC ................. G06Q 30/0601–0645; G06Q 30/08
USPC ............................................. 705/26.1–27.2
See application file for complete search history.

(56) References Cited

U.S. PATENT DOCUMENTS 11,625,450 B1 *     4/2023     Roman ................. H04L 67/535
                                                            707/721
2022/0391683 A1 *     12/2022     Cmielowski ............. G06N 3/08
2023/0334338 A1 *     10/2023     Moon ...................... G06N 5/02
(Continued)

OTHER PUBLICATIONS

Yin, J. (2021). Misbehaviour detection algorithms and application in social networks (Order No. 30612551). Available from ProQuest Dissertations and Theses Professional. (2877963156). Retrieved from https://dialog.proquest.com/professional/docview/2877963156?accountid=131444 (Year: 2021).*
(Continued)

*Primary Examiner* — Ashley D Preston
(74) *Attorney, Agent, or Firm* — Haynes and Boone, LLP

(57)     ABSTRACT

Embodiments described herein provide systems and methods for training a sequential recommendation model. Methods include determining a difficulty and quality (DQ) score associated with user behavior sequences from a training dataset. User behavior sequences are sampled during training based on their DQ scores. A meta-extrapolator may also be trained based on user behavior sequences sampled according to DQ score. The meta-extrapolator may be trained with high quality low difficulty sequences. The meta-extrapolator may then be used with an input of high quality high difficulty sequences to generate synthetic user behavior sequences. The synthetic user behavior sequences may be used to augment the training dataset to fine-tune the sequential recommendation model, while continuing to sample user behavior sequences based on DQ score. As the DQ score is based on current model predictions, DQ scores iteratively update during the training process.

20 Claims, 13 Drawing Sheets

(56) References Cited

U.S. PATENT DOCUMENTS

2024/0028935 A1 * 1/2024 Dorle ..................... G06N 20/00

OTHER PUBLICATIONS

User Behavior Sequence for Items Recommendation in SmartNews Ads, Jul. 20, 2022, SmartNews, Inc. (Year: 2022).*

Kun Zhou et al., S3-Rec: Self-Supervised Learning for Sequential Recommendation with Mutual Information Maximization. In The 29th ACM International Conference on Information & Knowledge Management (CIKM '20), Oct. 19-23, 2020, pp. 1893-1902, Virtual Event, Ireland.

Xu Xie et al., Contrastive Pre-Training for Sequential Recommendation, in WWW '21: The Web Conference 2020, Apr. 19-23, 2021, (11 pages) Ljubljana, Slovenia.

Jingtao Ding et al., Simplify and Robustify Negative Sampling for Implicit Collaborative Filtering, 34th Conference on Neural Information Processing Systems (NeurPS 2020), 12 pages, Vancouver, Canada.

Qiannan Zhu et al., A Gain-Tuning Dynamic Negative Sampler for Recommendation. In Proceedings of the ACM Web Conference 2022 (WWW '22), Apr. 25-29, 2022, 10 pages, Virtual Event, Lyon, France.

* cited by examiner

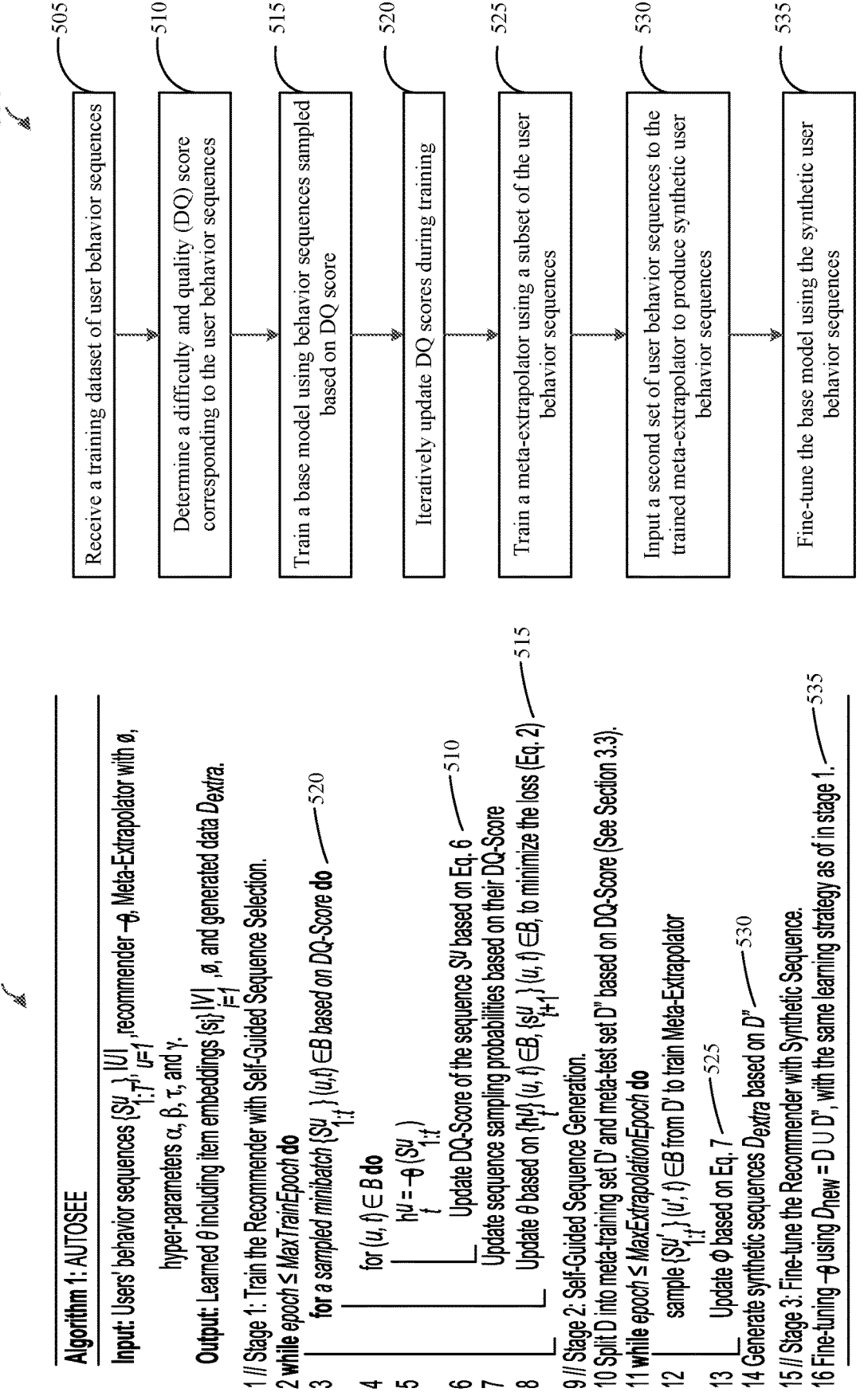

550

505   Receive a training dataset of user behavior sequences

510   Determine a difficulty and quality (DQ) score corresponding to the user behavior sequences 515   Train a base model using behavior sequences sampled based on DQ score 520   Iteratively update DQ scores during training 525   Train a meta-extrapolator using a subset of the user behavior sequences 530   Input a second set of user behavior sequences to the trained meta-extrapolator to produce synthetic user behavior sequences 535   Fine-tune the base model using the synthetic user behavior sequences

Algorithm 1: AUTOSEE

Input: Users' behavior sequences $\{S^u_{1:T}\}^{|U|}_{u=1}$, recommender $-\theta$, Meta-Extrapolator with $\phi$, hyper-parameters $\alpha$, $\beta$, $\tau$, and $\gamma$.

Output: Learned $\theta$ including item embeddings $\{s_j\}^{|V|}_{j=1}$, $\phi$, and generated data $D_{extra}$.

1 // Stage 1: Train the Recommender with Self-Guided Sequence Selection.
2 while epoch ≤ MaxTrainEpoch do
3    for a sampled minibatch $\{S^u_{1:t}\}$ $(u, t) \in B$ based on DQ-Score do —— 520
4      for $(u, t) \in B$ do
5        $h^u_t = -\theta(S^u_{1:t})$
6        Update DQ-Score of the sequence $S^u$ based on Eq. 6 —— 510
7        Update sequence sampling probabilities based on their DQ-Score
8      Update $\theta$ based on $\{h^u_t\}$ $(u, t) \in B$, $\{S^u_{t+1}\}$ $(u, t) \in B$, to minimize the loss (Eq. 2) —— 515
9 // Stage 2: Self-Guided Sequence Generation.
10 Split D into meta-training set D' and meta-test set D'' based on DQ-Score (See Section 3.3).
11 while epoch ≤ MaxExtrapolationEpoch do
12    sample $\{S^{u'}_{1:t}\}$ $(u', t) \in B$ from D' to train Meta-Extrapolator
13    Update $\phi$ based on Eq. 7 —— 525
14 Generate synthetic sequences $D_{extra}$ based on D'' —— 530
15 // Stage 3: Fine-tune the Recommender with Synthetic Sequence.
16 Fine-tuning $-\theta$ using $D_{new} = D \cup D''$, with the same learning strategy as of in stage 1. —— 535

FIG. 5A

| Category | Standard Training | | | w/ de-noising | w/ alleviating data-sparsity | | | AUTOSEE |
|---|---|---|---|---|---|---|---|---|
| Model | NCF | GRU4Rec | SASRec | T-SCE | S3-Rec | CL4SRec | MMInfoRec | |
| Beauty | | | | | | | | |
| HR@5 | 1.50 | 1.64 | 3.84 | 4.01 | 3.85 | 4.23 | 5.25±0.21 | 7.14±0.06 |
| HR@10 | 2.93 | 2.83 | 6.07 | 6.14 | 6.35 | 6.94 | 7.45±0.12 | 9.75±0.12 |
| NDCG@5 | 0.84 | 0.99 | 2.49 | 2.68 | 2.40 | 2.81 | 3.71±0.06 | 5.08±0.06 |
| NDCG@10 | 1.30 | 1.37 | 3.21 | 3.42 | 3.20 | 3.73 | 4.43±0.10 | 5.92±0.08 |
| Sports | | | | | | | | |
| HR@5 | 1.22 | 1.62 | 2.20 | 2.43 | 2.26 | 2.17 | 2.78±0.09 | 3.97±0.04 |
| HR@10 | 2.19 | 2.04 | 3.41 | 3.87 | 3.73 | 3.69 | 3.89±0.10 | 5.65±0.04 |
| NDCG@5 | 0.69 | 1.03 | 1.45 | 1.56 | 1.45 | 1.37 | 1.91±0.08 | 2.84±0.06 |
| NDCG@10 | 1.00 | 1.10 | 1.84 | 2.01 | 1.93 | 1.91 | 2.33±0.11 | 3.23±0.15 |
| ML-1M | | | | | | | | |
| HR@5 | 1.64 | 9.93 | 13.61 | 13.88 | 14.01 | 11.47 | 13.98±0.32 | 19.68±0.45 |
| HR@10 | 3.13 | 18.06 | 22.16 | 22.98 | 23.45 | 19.75 | 21.08±0.12 | 28.47±0.41 |
| NDCG@5 | 0.96 | 5.74 | 8.80 | 8.99 | 8.79 | 6.62 | 9.44±0.14 | 13.28±0.15 |
| NDCG@10 | 1.43 | 8.35 | 11.58 | 11.64 | 11.44 | 9.28 | 11.70±0.22 | 16.11±0.12 |
| Yelp | | | | | | | | |
| HR@5 | 1.42 | 1.52 | 1.72 | 1.88 | 1.94 | 2.29 | 5.04±0.06 | 4.87±0.06 |
| HR@10 | 2.53 | 2.63 | 2.86 | 2.96 | 3.35 | 3.92 | 6.01±0.09 | 7.37±0.17 |
| NDCG@5 | 0.80 | 0.91 | 1.07 | 1.20 | 1.19 | 1.44 | 3.19±0.08 | 2.86±0.08 |
| NDCG@10 | 1.29 | 1.34 | 1.44 | 1.56 | 1.64 | 1.97 | 3.60±0.13 | 3.67±0.06 |

FIG. 8

Table 3: Performance (NDCG@5) w.r.t. number of original training sequences to be used (on Beauty).

| % of original sequences | AUTOSEE w/o Sequence Extrapolation | AUTOSEE | Relative Improv. (%) |
|---|---|---|---|
| 90 | 4.98 | 5.08 | 2.01 |
| 70 | 4.86 | 5.03 | 3.50 |
| 50 | 3.93 | 4.74 | 20.61 |
| 30 | 2.79 | 4.48 | 60.57 |
| 10 | 1.94 | 4.03 | 107.73 |

FIG. 11

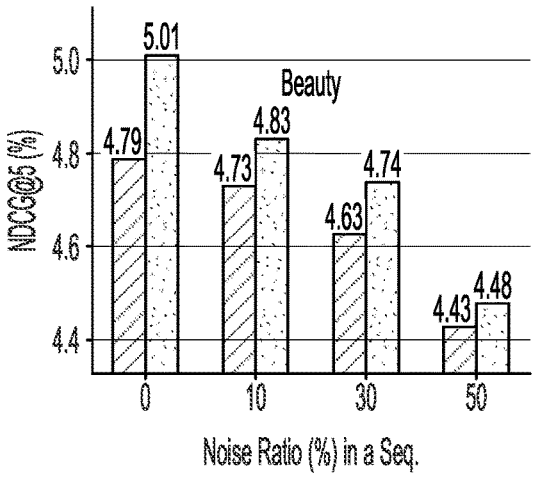
FIG. 12A
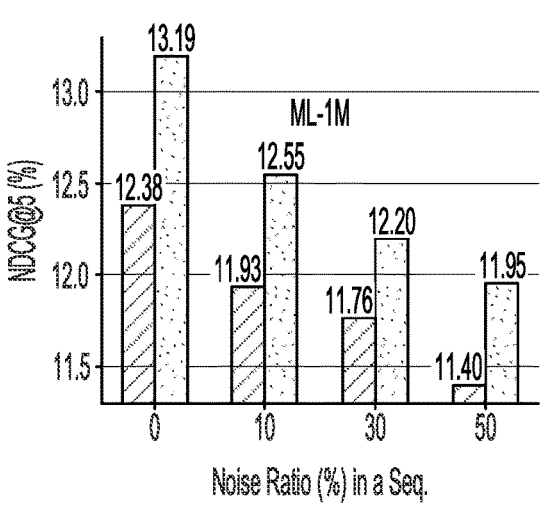
FIG. 12B
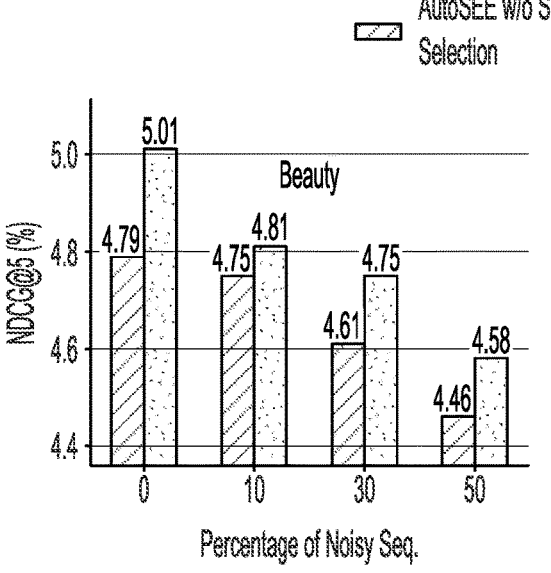
FIG. 12C
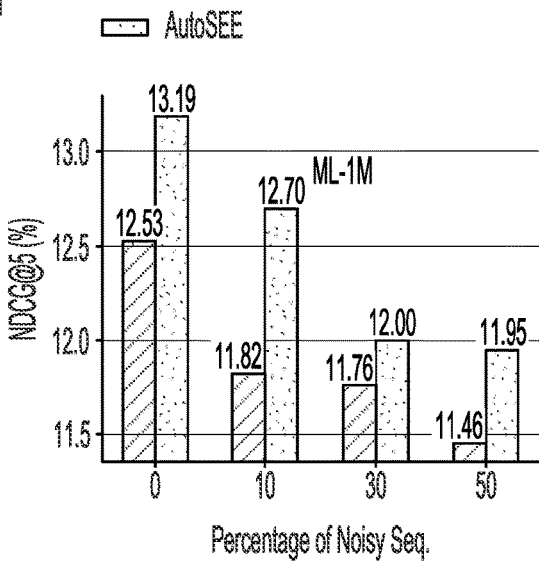
FIG. 12D Table 4: Ablation study of AutoSEE on Beauty and Yelp.

| Model | Beauty | | Yelp | |
|---|---|---|---|---|
| | HR@5 | NDCG@5 | HR@5 | NDCG@5 |
| SASRec | 3.84 | 2.49 | 1.72 | 1.07 |
| SASRec w/ NCE | 4.55 | 2.98 | 2.51 | 1.55 |
| SASRec w/ Softmax | 6.52 | 4.72 | 2.39 | 1.54 |
| AUTOSEE w/o Extrapolated Seq. | 7.02 | 5.02 | 4.72 | 2.68 |
| AUTOSEE w/ D-score Guided | 7.05 | 5.06 | 4.91 | 2.87 |
| AUTOSEE w/ Q-score Guided | 7.03 | 4.94 | 4.74 | 2.74 |
| AUTOSEE | 7.18 | 5.12 | 4.95 | 2.93 |

FIG. 13

SYSTEM, METHOD, AND NON-TRANSITORY MACHINE-READABLE MEDIUM FOR SELF-GUIDED SEQUENCE SELECTION AND EXTRAPOLATION

TECHNICAL FIELD

The embodiments relate generally to natural language processing and machine learning systems, and more specifically to systems and methods for self-guided sequence selection and extrapolation.

BACKGROUND

Machine learning systems have been widely used in sequential recommendation tasks. Sequential recommendation provides a sequence of recommended items that capture item relationships and behaviors of users, e.g., recommending a water bottle holder after a user purchases a water bottle. Dataset limitations may pose difficulty in training accurate sequential recommender models, because sequential recommendation data can often be sparse, or on the other hand rich but redundant, and/or noisy.

Therefore, there is a need for improved systems and methods for effectively using training datasets for training sequential recommendation models.

BRIEF DESCRIPTION OF THE DRAWINGS

FIG. 5A provides an example pseudo-code illustrating an example algorithm for training a sequential recommendation system, according to some embodiments.

FIG. 5B provides an example logic flow diagram illustrating an example algorithm for training a sequential recommendation system, according to some embodiments.

FIGS. 8-13 provide example tables illustrating example performance of different summarization models and training methods discussed herein.

Figure 1:
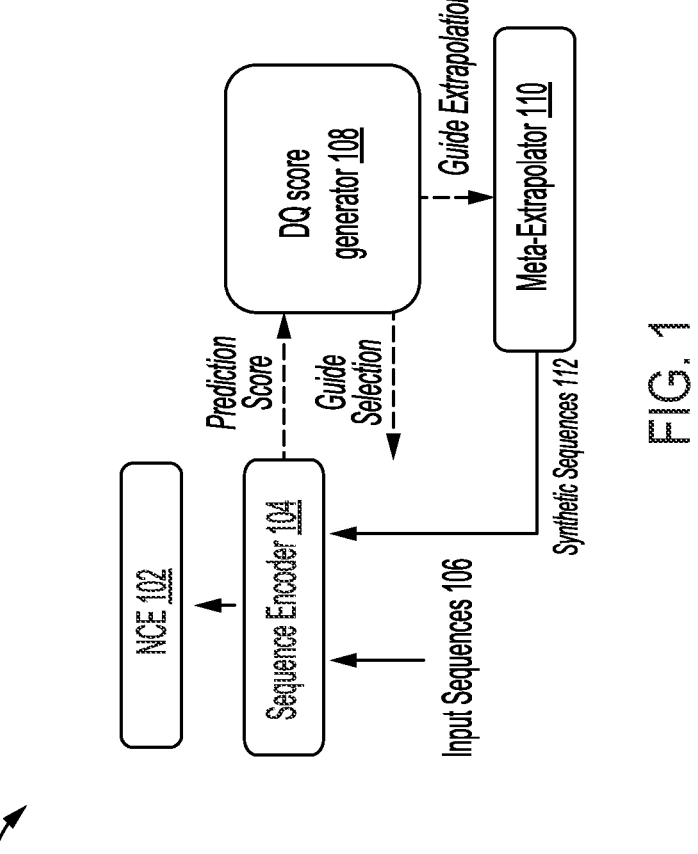
FIG. 1 is a simplified diagram illustrating a method for training a sequential recommendation model using a difficulty and quality (DQ) score according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Sequential recommendation (SR) systems are used to predict a user's interest to items based on their historical interactions. Implicit user behavior sequences (such as reviews, clicks, and ratings) are common in building modern recommender systems because of their ubiquity. However, these sequences in the real world can be sparse (scarce), or rich but redundant, or noisy, and therefore challenging to efficiently train an accurate model based on imperfect training data.

In view of the need for improved systems and methods for effectively using training datasets for training sequential recommendation models, embodiments described herein provide for training a sequential recommendation model governed by difficulty and quality (DQ) scores that evaluate the training samples. The difficulty component of a DQ score is based on the accuracy of the model's prediction with its current parameters. The quality component of a DQ score is based on the variance of current model prediction accuracy across the members of a sequence. The DQ score is computed in unsupervised fashion and is dynamically updated along with the model. User behavior sequences can then be sampled during training based on their DQ scores. In this way, according to the DQ score, high quality and informative (difficult) sequences may be selected for training the model to achieve improved training performance. In this way, rather than simply removing noisy data from a training dataset, which may exacerbate sparsity problems, input sequences may be sampled intelligently thereby utilizing all of the data, but focusing more on the useful data.

In one implementation, a meta-extrapolator which may be used to generate additional training user sequences, may also be trained based on user behavior sequences sampled according to DQ score. The meta-extrapolator may be trained with high quality low difficulty sequences. The meta-extrapolator may then be used with an input of high quality high difficulty sequences to generate synthetic user behavior sequences. The synthetic user behavior sequences may be used to augment the training dataset to fine-tune tune the sequential recommendation model, while continuing to sample user behavior sequences based on DQ score. As the DQ score is based on current model predictions, DQ scores iteratively update during the training process. The framework of sampling and extrapolation based on DQ score may be referred to as Automatic self-guided sequence selection and extrapolation (AutoSEE).

Many benefits may be realized by implementing the systems and methods described herein. Automatic self-guided sequence selection and extrapolation using a DQ score may allow a system to train a model using fewer training data samples, thereby requiring less memory resources, while achieving the same or better model performance. By iteratively including DQ score in the training process, a model may reach an acceptable level of performance more rapidly, requiring fewer compute cycles, less power, and less real-world time. These benefits may be realized by using all or a subset of the methods described herein. For example, benefits may be realized by using a DQ score in model training, even without extrapolation and fine-tuning of the model. The methods described herein may also be used in connection with other methods of dealing with sparse, redundant, and/or noisy data such as methods which involve automatic feature selection, automatic feature interaction, automatic model design, and specific learning objectives.

FIG. 1 is a simplified diagram illustrating an AutoSEE framework 100 for training a sequential recommendation model using a difficulty and quality (DQ) score. AutoSEE framework 100 comprises a sequence encoder 104 and a meta-extrapolator 110 which are both coupled to a DQ score generator 108. Specifically, sequence encoder 104 is trained using input sequences 106. User behavior sequences 106 may be generated based on actual user data. As such, the data may be sparse. For example, a dataset which is limited to a certain category of products, may not include a sufficiently large number of sequences to efficiently train a sufficiently accurate model using traditional methods. Sequences may also be rich in some respects, but redundant. For example, may user behavior sequences may include the same or similar sequences of purchases, where not much additional information is gained by the inclusion of the additional similar sequences. Having many "redundant" sequences may also lead to over-fitting of a model trained on those sequences. Further, sequences may be noisy. For example, a user may be purchasing items for a similar purpose (e.g., preparing for a fishing trip), but for some reason in the middle of such a sequence they may purchase something completely unrelated for some eccentric or unexplainable reason. Noisy sequences may also not be very informative in training a sequential recommendation model as the sequence is not inherently predictable. As a way to deal with data issues described above, training of sequence encoder 104 is done by sampling input sequences 106 in a distribution guided by DQ score generator 108, which is described in more detail below.

Sequence encoder 104 outputs a prediction score for each of the items of interest associated with all or a subset of the steps in the sequence. The predictions may be considered a probability distribution across the items, and the items may be ranked based on their relative prediction scores. For example, for a user behavior sequence which includes 10 items, sequence encoder 104 may generate a probability distribution across a library of items for each position in the sequence, the highest probability item being the predicted item for that position in the sequence.

The output of sequence encoder 104 may be used to generate a noise contrastive estimation (NCE) loss at the NCE module 102. Specifically, the NCE loss is computed based on comparing the prediction distribution against the ground-truth and a noise distribution. The predicted item from the sequence encoder 104 can be compared against the actual item in the input sequence 106, which is taken as ground-truth. Other methods of generating loss may be used in place of NCE with similar results. Parameters of sequence encoder 104 may be updated via backpropagation to minimize the NCE loss. Input sequences 106 may be input to sequence encoder 104 in batches comprising a subset of the entire training dataset between parameter updates.

In an iterative fashion, prediction scores of sequence encoder 104 are used by DQ score generator 108 to produce DQ scores for input sequences 106, which are then used to guide sampling of input sequences 106 as sequence encoder 104 continues to be trained. The probability of a sequence being sampled may be proportional to the DQ score. As illustrated, DQ score generator 108 "guides selection" of the input sequences 106. For example, a sequence with a higher DQ score than another sequence may be sampled at a higher rate than the sequence with the lower DQ score. This still allows low DQ score sequences to contribute to the training of the sequence encoder 104, while preferring those which are more beneficial to the training. By focusing on high DQ score sequences, the model training may converge faster because the "difficult" sequences are more informative, as they represent the more difficult to predict sequences. By including the "quality" component of a DQ score, this suppresses the input of sequences which are difficult because they are of low quality. This iterative process may improve the training process, for example, by allowing for sequences which were once considered difficult, but are no longer difficult for the current encoder, to not be sampled as frequently, thus improving the average informativeness of samples sequences at each point of a training sequence. How the DQ score generator 108 determines DQ scores is described in more detail with respect to FIG. 2.

DQ score generator 108 may be used to guide training of meta-extrapolator 110. Meta-extrapolator 110 is used to generate synthetic sequences 112 which may be used in a second stage of training (fine-tuning) sequence encoder 104. The fine-tuning stage may be done using synthetic sequences 112, either alone or in addition to input sequences 106. Synthetic sequences 112 may be generated using a number of methods. In some embodiments, a meta-extrapolator 110 is trained using input sequences 106, and once trained, meta-extrapolator 110 is fed additional sequences of the input sequences 106 in order to generate synthetic sequences 112. The training and usage of the meta-extrapolator 110 is described in further detail in reference to FIG. 3.

Figure 2:
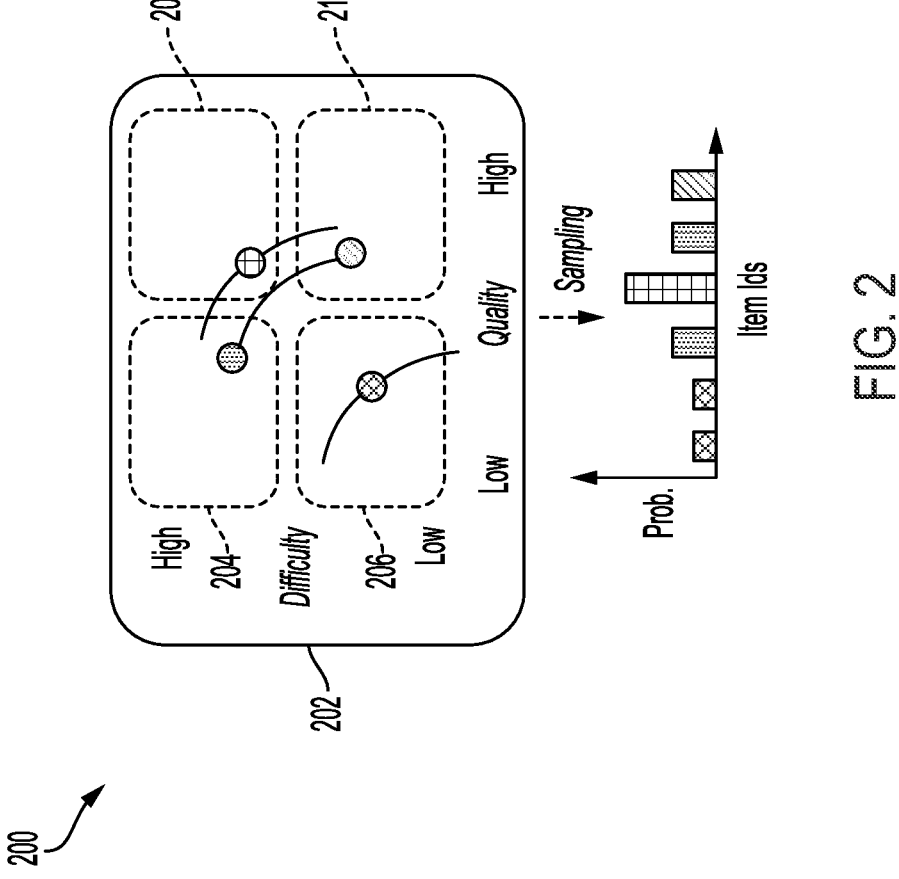
FIG. 2 is a simplified diagram illustrating a plot of DQ score and self-guided sequence selection according to some embodiments.

FIG. 2 is a simplified diagram 200 illustrating a plot 202 of DQ scores used for self-guided sequence selection according to some embodiments. As discussed above with reference to FIG. 1, each user behavior sequence of the input sequences 106 may have a DQ score computed based on predictions of sequence encoder 104. Different methods of generating a DQ score may be used with varying results. What follows is a discussion of one set of methods for generating a DQ score which provides improved performance in training sequence encoder 104.

A training dataset of user behavior sequences such as input sequences 106 may be represented as $\mathcal{D}$. $\mathcal{D}$ may consist of sequences of interactions between users $\mathcal{U}$ and items $\mathcal{V}$. Each user $u \in \mathcal{U}$ has a behavior sequence $$S^u = \left[s_1^u, \ldots, s_t^u, \ldots, s_{|S^u|}^u\right],$$

which is sorted in chronological order. Sequence encoder 104 may be represented as $f_\theta$. Learning sequence encoder $f_\theta$ includes learning item embeddings $\{s_i\}_{i=1}^{|V|}$ given $$s_{\leq t}^u$$

such that the sequence encoder can predict with some accuracy the target item $$s_{t+1}^u.$$

Parameters $\theta$ of sequence encoder $f_\theta$ may be optimized by minimizing the log-likelihood over T with mini-batch gradient descent:

$$\mathcal{L}_{NIP} = \sum_{u=1}^{N} \sum_{t=2}^{T} \mathcal{L}_{NIP}(u, t) = \sum_{u=1}^{N} \sum_{t=2}^{T} -\log p_\theta(s_{t+1}^u \mid s_{\leq t}^u)$$

where N is the mini-batch size and T is the maximum length of a sequence.

The probability of the target item $$s_{t+1}^u$$

to be recommended can be computed by:

$$p_\theta(s_{t+1}^u \mid h_t^u) = \exp((s_{t+1}^u)' \cdot h_t^u) \Big/ \sum_{\tilde{s} \in V} \exp((\tilde{s})' \cdot h_t^u)$$

where $$h_t^u = f_\theta\left(\{s_j^u\}_{j=1}^t\right)$$

summarizes the user's interests at time t.

As discussed above, "difficult" sequences are those which are hard for a model to predict, for example those where model decisions often alternate. Based on this principle, a method for determining a difficulty score for a given sequence may be developed. For example, the difficulty score of a sequence $S^u$ may be defined based on the prediction score of target items over all time steps $$\{p_{s_{t+1}^u}\}_{t=1}^T,$$

and using exponential moving average (EMA) over the score to improve the smoothness of the signal:

$$\mathcal{D}_{S^u}^i = \alpha \cdot \mathcal{D}_{S^u}^{(i-1)} + (1-\alpha) \cdot \mathbb{E}_{(t)}\left[1 - p_{s_{t+1}^u}^u\right]$$

where $$\mathcal{D}_{S^u}^i$$

denotes the difficulty score of sequence $S^u$ at the i-th training iteration and $\alpha$ controls the moving average smoothness.

The lower the prediction scores of target items, the more information it contains. Training using difficult sequences improves the learning efficiency and performance of the model. Although benefiting learning, using the D score only can also increase the risk that learning can be harmed by noisy interactions (i.e., false positives) because both hard positive samples and false-positive samples may have a high D score. A Quality score is introduced to mitigate this effect.

The quality of a sequence is negatively correlated to the noise (false positive) level of that sequence. Sequences of highest quality contain no interaction noise (i.e., all the interacted items represent user interests). The quality of a sequence $S^u$ can therefore be characterized by the first-order difference of prediction score variances of all target items.

An exponential moving average (EMA) may also be used in computing the quality score as instance learning signals can be noisy and non-stationary. Q score may be defined as:

$$Q_{S^u}^i \leftarrow \beta \cdot Q_{S^u}^{(i-1)} + (1-\alpha) \cdot \sigma\left(\frac{\mathbb{V}_{S^u}^{i-1} - \mathbb{V}_{S^u}^i}{\mathbb{V}_{S^u}^i + \in}\right)$$

where $$Q_{S^u}^i$$

denotes the Q score of sequence $S^u$ at the i-th training iteration. $\beta$ controls the smoothness and $$\mathbb{V}_{S^u}^i$$

is defined as:

$$\mathbb{V}_{S^u}^i = \mathbb{E}_{(t)}\left[\left(1 - p_{s_{t+1}}^u\right)^2\right] - \mathbb{E}_{(t)}^2\left[1 - p_{s_{t+1}}^u\right]$$

The Q score as defined above is based on the observation that the model often has different prediction scores on the false-positive and true-positive items, creating the variance $$\mathbb{V}_{S^u}^i$$

in a given sequence $S^u$.

$$\mathbb{V}_{S^u}^i$$

tends to remain high if $S^u$ contains a large number of false-positive items.

A combined DQ score may be defined which is based on the D score and Q score discussed above. The DQ score may be used as a measure of the importance of sequences to training a model. For each sequence $S^u$ there is a $\mathcal{D}_{S^u}$ and a $Q_{S^u}$. A mapping function $g(\bullet)$ may be defined such that $DQ_{S^u} = g(\mathcal{D}_{S^u}, Q_{S^u})$. $g(\bullet)$ may be defined in a number of ways with varying results. In general, $g(\bullet)$ may be monotonically increasing with increasing D or Q score. In some embodiments, $g(\bullet)$ is asymmetrical with respect to D and Q, meaning that D and Q are weighted differently. For example, the DQ score may increase more rapidly with respect to D than with respect to Q. In other embodiments, it may be beneficial for $g(\bullet)$ to be symmetric (i.e., treating D and Q the same). For example, DQ score may be defined as:

$$DQ_{S^u}^i = \left(\left(\mathcal{D}_{S^u}^i\right)^2 + \left(Q_{S^u}^i\right)^2\right)^\tau$$

where $$DQ_{S^u}^i$$

denotes the DQ score of S" at the i-th training iteration and τ controls the flattening degree of the value distribution.

As illustrated, the X-axis of the plot represents Q score and the Y-axis represents D score. The circles plotted represent the DQ score of certain user behavior sequences. Curved lines in the plot represent combinations of D and Q values with the same combined DQ score as defined above, and therefore the same probability of being sampled during training of the sequence encoder 104. Note that same-DQ score lines are curved due to the non-linear combination of D and Q in the DQ equation described above.

Below the plot in FIG. 2 is a representation of the probability of each item (user behavior sequence) being sampled. Hash marks in the probability distribution correspond to those in the plot, representing their corresponding DQ scores. For example, sequences in quadrant 206 have both low D and low Q scores and therefore have the lowest corresponding DQ score and lowest probability of being sampled. Sequences in quadrant 204 have a relatively high D score but a relatively low Q score and therefore have a mid-range corresponding DQ score and probability of being sampled. The sequence in quadrant 210 is the mirror of the sequence in quadrant 204, having a relatively high Q score but relatively low D score. Note that while having different D and Q scores from each other, as illustrated in the probability distribution, these sequences have the same probability of being sampled since the probability is based on the combined DQ score. Finally, the sequence in quadrant 208 has both a relatively high D and Q scores and therefore has the highest probability of being sampled of the illustrated sequences.

Figure 3:
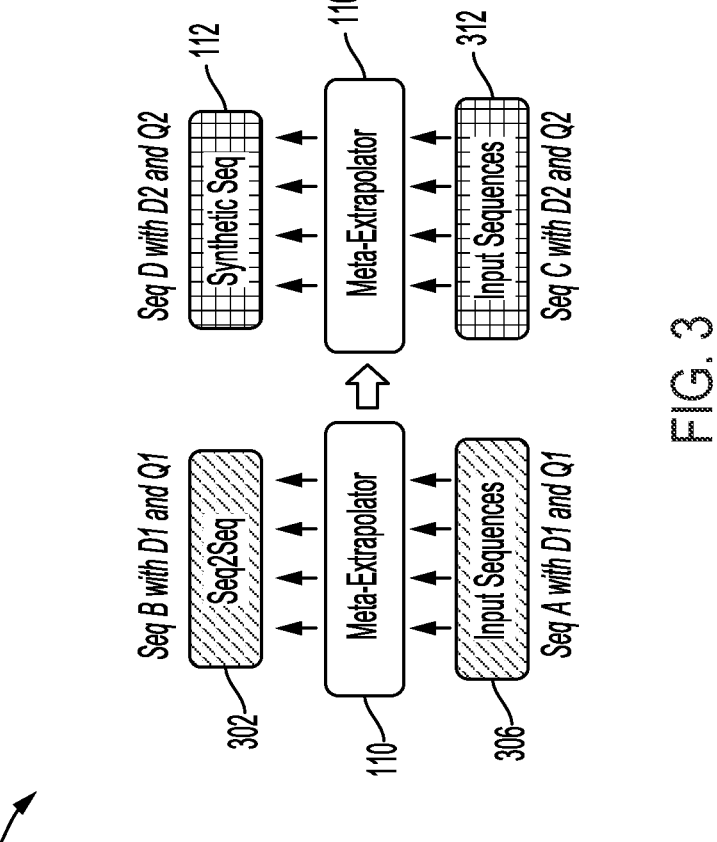
FIG. 3 is a simplified diagram illustrating training and utilizing a meta-extrapolator according to some embodiments.

FIG. 3 is a simplified diagram 300 illustrating training and utilizing a meta-extrapolator according to some embodiments. The left side of the diagram represents the training phase of the meta-extrapolator 110. During training of the meta-extrapolator 110, sequences 306 are sampled from the input sequences 106 and used to train the meta-extrapolator 110 to output a similar sequence of items 302. Note that the hash marks in FIG. 3 correspond to the same hash marks in FIG. 2. As illustrated, input sequences 306 are sequences which have high Q scores but low D scores. Note that in this instance, individual D and Q scores are used rather than the combined DQ score which is used for training the sequence encoder 104. Further, DQ scores are fixed throughout the training of the meta-extrapolator 110 since DQ scores are based on the sequence encoder 104 prediction which do not change during meta-extrapolator training.

Training of meta-extrapolator 110 is performed by forming pairs of sequences with similar DQ scores defined as <$S_i, S_j$> where |$DQ_{S^i}$−$DQ_{S^{ij}}$|<$Δ_{ij}$. The parameter $Δ_{ij}$ may be set to a value, for example, of 0.01. A meta-extrapolator training set $\mathcal{D}' ⊂ \mathcal{D}$ is formed in which for every S"∈D', it has $\mathcal{D}_{S^u}$≤γ∪$\mathcal{Q}_{S^u}$>γ. In other words, the selected sequences have D scores below a certain threshold, and Q scores above a certain threshold. The thresholds may be the same value, or different values. For a given pair <$S_i, S_j$>, meta-extrapolator 110 views one sequence as an input sequence and the other as a target sequence to perform sequence to sequence type training, which aims a maximizing the probability distribution over the target sequence:

$$P_\phi(S^j \mid S^i) = \prod_{t=20}^{T} P_\phi(s^j_{t+1} \mid s^j_{\le t}, S^i)$$

To perform training, a unique token may be added to the end of the sequence as an end-of-generation identifier.

After training, the meta-extrapolator 110 may be used to generate new sequences with similar DQ score as the input sequence. As illustrated, during the training phase low D score, high Q score sequences were used as inputs and targets, and during the inference stage on the right side of the diagram, input sequences 312 are comprised of sequences with high D and Q scores, with the idea that synthetic sequences 112 will also have high D and Q scores. Specifically, a new dataset $\mathcal{D}"$∈D is selected where $\mathcal{D}"$∈D. The sequence pairs in $\mathcal{D}"$ are selected as sequences with high D and Q scores. Synthetic sequences 112, referred to as $\mathcal{D}_{extra}$ are generated by the meta-extrapolator 110 based on $\mathcal{D}"$. Referring back to FIG. 1, $\mathcal{D}_{extra}$ may be used to continue training (i.e., fine tuning) sequence encoder 104. Sequences in $\mathcal{D}_{extra}$ may be used uniformly, or DQ scores may be calculated throughout fine-tuning as it was done during the initial training phase. Further, a larger dataset may be used for fine-tuning which is a combination of the original input sequences 106 and the synthetics sequences $\mathcal{D}_{new}=\mathcal{D} ∪ \mathcal{D}_{extra}$.

Once trained, sequence encoder 104 may be used in sequential recommendation tasks. For example, a user behavior sequence may be input to sequence encoder 104, and the output of sequence encoder 104 may be used to predict a next item. The predicted next item may be displayed to a user as a suggestion. For example, a user interface display may be caused to display the predicted next item with a link the user may click to view and/or purchase that item.

Figure 4:
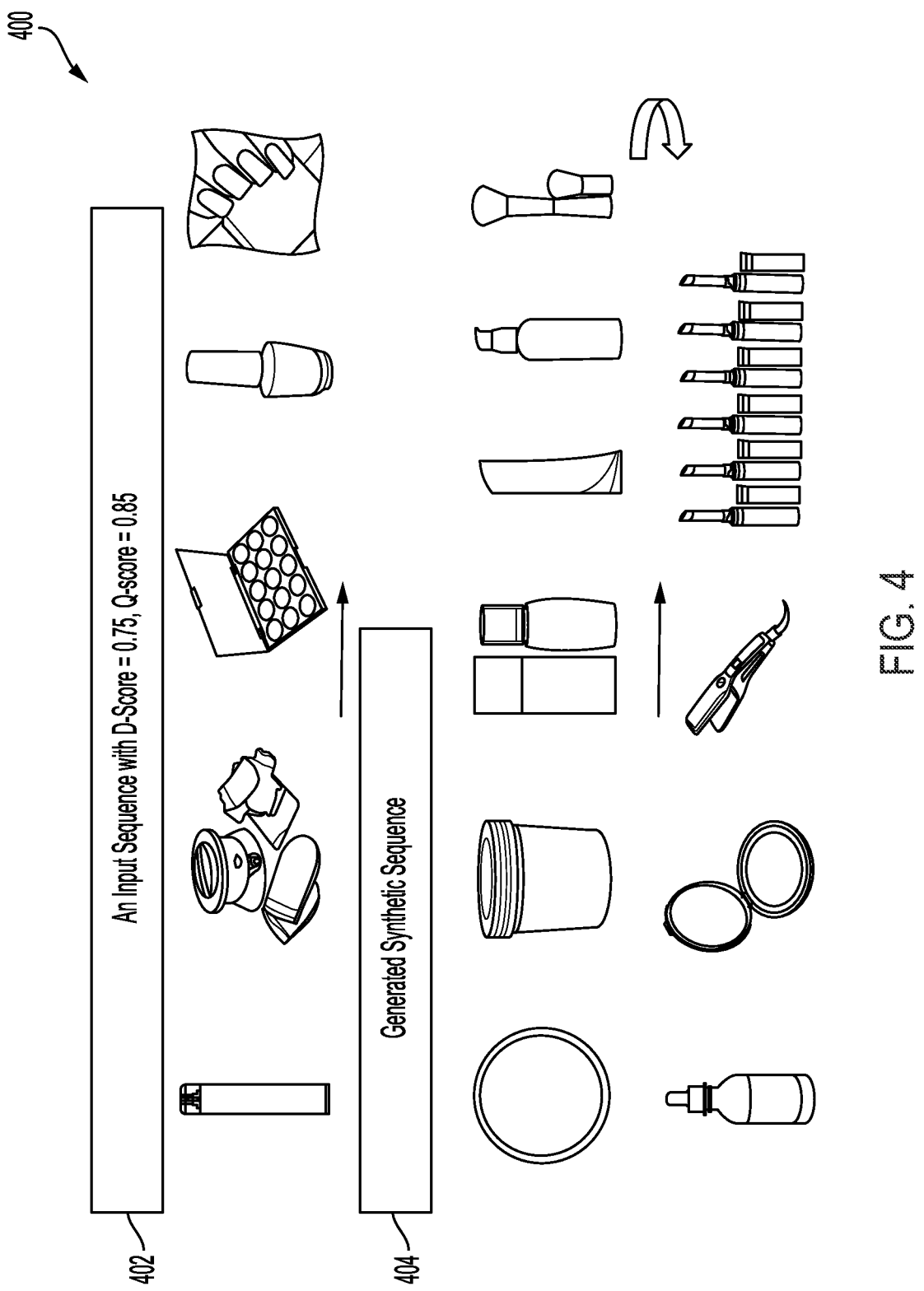
FIG. 4 is an exemplary input user behavior sequence and corresponding synthetic user behavior sequence.

FIG. 4 is an exemplary input user behavior sequence 402 and corresponding synthetic user behavior sequence 404. For example, the input sequence 402 comprises a sequence of user interacted items, such as, in a sequential order, a lipstick, skincare lotions, an eyeshadow palette, a nail polish bottle, and a nail polish sheet. Input sequence 402 may be one of the input sequences 106. This input sequence 402 may be associated with a D-score of 0.75 (relatively high difficulty) and Q-score of 0.85 (high quality). Synthetic user behavior sequence 404 may be generated by a trained meta-extrapolator 110 based on the user behavior sequence 402. As illustrated, synthetic user behavior sequence 404 may comprise a makeup mirror, a jar of lotion, a bottle of liquid foundation, a lipstick, an eye cream bottle, a set of makeup brushes, a set of lipsticks of different colors, a manicure tool, a compact powder disk, a bottle of facial essence.

As discussed with respect to FIG. 3, an input sequence 312 (such as sequence 402) may be input into the trained meta-extrapolator. Input sequences may be selected from the input sequences 106 based on their DQ score, selecting sequences with high difficulty and high quality, likewise producing relatively high difficulty and high quality outputs such as synthetic user behavior sequence 404. Note that while sequences 402 and 404 may have similar DQ scores, they may have different lengths. In this particular example, the synthetic sequence 404 may be much longer than the original input sequence 402.

FIG. 5A provides an example pseudo-code illustrating an example algorithm 500 for training a sequential recommendation system based on the framework shown in FIGS. 1-4. FIG. 5B provides an example logic flow diagram 550 illustrating a method of training a sequential recommendation model according to the algorithm 500 in FIG. 5A, according to some embodiments described herein. One or more of the processes of method 550 may be implemented, at least in part, in the form of executable code stored on non-transitory, tangible, machine-readable media that when run by one or more processors may cause the one or more processors to perform one or more of the processes. In some embodiments, logic flow diagram 550 corresponds to an example operation of the AutoSEE module 630 of FIG. 6 that trains a sequential recommendation model.

At step 505, a system receives a training dataset of user behavior sequences, for example via a communication interface. The training dataset may be composed of sequences generated by tracking user behavior. For example, an online store may track the sequence of items that a number of users purchase, and those may be used to generate user behavior sequences. The training dataset may be sparse, have noisy sequences, and/or have rich but redundant sequences.

At step 510, the system determines a difficulty and quality (DQ) score corresponding to the user behavior sequences. Predictions of a sequence encoder may be used to determine the DQ scores as discussed above with reference to FIG. 2. DQ scores may be determined for all of the user behavior sequences in the dataset, or the may be determined only for a subset of the sequences. For example for a large training dataset, subsets of the training data may be partitioned so that DQ scores are not computed for all the sequences at each iteration of the training process.

At step 515, the system trains a base model using behavior sequences sampled based on DQ score. For example, the base model may be a sequence encoder 104 as discussed with respect to FIG. 1. The trained model may be the same model that is used as the basis for DQ scores.

At step 520, the system iteratively updates DQ scores during training. As the DQ scores are determined based on predictions of the model, and the model is updated as it is trained, DQ scores may be updated each time parameters of the model are updated. Alternatively, DQ scores may be updated less frequently than parameters of the model.

At step 525, the system trains a meta-extrapolator using a subset of the user behavior sequences. The training may be performed, for example, as described with respect to FIG. 3. The subset of user behavior sequences may be selected based on D and Q scores using the predictions of the model (i.e., sequence encoder 104) as trained at steps 515-520.

At step 530, the system inputs a second set of user behavior sequences to the trained meta-extrapolator to produce synthetic user behavior sequences. The selection of the second set of user behavior sequences may also be based on D and Q scores. The criteria for the D and Q scores may be different than for the training of the meta-extrapolator. For example, training of the meta-extrapolator may be performed using sequences with D scores below a threshold and Q scores above a threshold, and generating synthetic sequences with the meta-extrapolator may be done using sequences with D scores above a threshold and Q scores above a threshold.

At step 535, the system fine-tunes the base model (i.e., sequence encoder 104) using the synthetic user behavior sequences. The synthetic user behavior sequences may be sampled based on DQ score, or they may be uniformly sampled. Further, the original training dataset may be combined with the synthetic user behavior sequences, and fine-tuning may be performed using sequences from both datasets.

Figure 6:
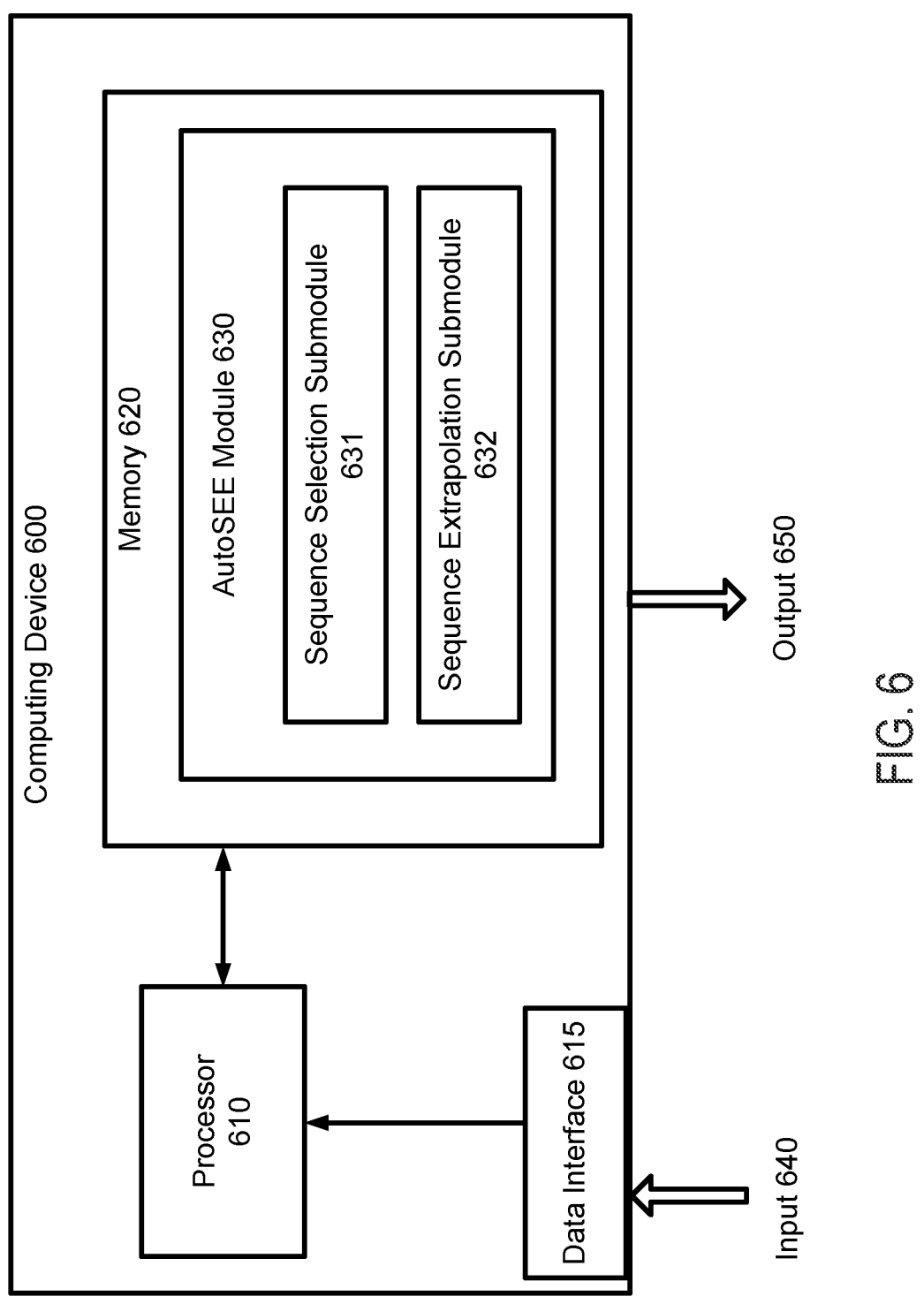
FIG. 6 is a simplified diagram illustrating a computing device implementing the methods described in FIGS. 1-5, according to one embodiment described herein.

FIG. 6 is a simplified diagram illustrating a computing device implementing the methods described in FIGS. 1-5, according to one embodiment described herein. As shown in FIG. 6, computing device 600 includes a processor 610 coupled to memory 620. Operation of computing device 600 is controlled by processor 610. And although computing device 600 is shown with only one processor 610, it is understood that processor 610 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 600. Computing device 600 may be implemented as a stand-alone subsystem, as a board added to a computing device, and/or as a virtual machine.

Memory 620 may be used to store software executed by computing device 600 and/or one or more data structures used during operation of computing device 600. Memory 620 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 610 and/or memory 620 may be arranged in any suitable physical arrangement. In some embodiments, processor 610 and/or memory 620 may be implemented on a same board, in a same package (e.g., system-in-package), on a same chip (e.g., system-on-chip), and/or the like. In some embodiments, processor 610 and/or memory 620 may include distributed, virtualized, and/or containerized computing resources. Consistent with such embodiments, processor 610 and/or memory 620 may be located in one or more data centers and/or cloud computing facilities.

In some examples, memory 620 may include non-transitory, tangible, machine readable media that includes executable code that when run by one or more processors (e.g., processor 610) may cause the one or more processors to perform the methods described in further detail herein. For example, as shown, memory 620 includes instructions for AutoSEE module 630 that may be used to implement and/or emulate the systems and models, and/or to implement any of the methods described further herein. An AutoSEE module 630 may receive input 640 such as an input training data (e.g., user behavior sequences) via the data interface 615 and generate an output 650 which may be a sequential recommendation model, or at inference, a sequential recommendation.

The data interface 615 may comprise a communication interface, a user interface (such as a voice input interface, a graphical user interface, and/or the like). For example, the computing device 600 may receive the input 640 (such as a training dataset) from a networked database via a communication interface. Or the computing device 600 may receive the input 640, such as user behavior sequences, from a user via the user interface.

In some embodiments, the AutoSEE module 630 is configured to train a sequential recommendation model utilizing automatic self-guided sequence selection and extrapolation. The AutoSEE module 630 may include the sequential recommendation model, a meta-extrapolator model, and further include sequence selection submodule 631, and a sequence extrapolation submodule 632. The sequence selection submodule 631 may be configured to sample/select user behavior sequences based on a determined DQ score. This may occur during initial training of a base sequential recommendation model, selecting samples for training and use by a meta-extrapolator, and during fine-tuning of the sequential recommendation model as discussed with reference to FIGS. 1-5. The sequence extrapolation submodule 632 may be configured to train a meta-extrapolator and generate synthetic user behavior sequences using the trained meta-extrapolator, as described with reference to FIGS. 1-5. In one embodiment, the AutoSEE module 630 and its submodules 631-632 may be implemented by hardware, software and/or a combination thereof.

Some examples of computing devices, such as computing device 600 may include non-transitory, tangible, machine readable media that include executable code that when run by one or more processors (e.g., processor 610) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 7:
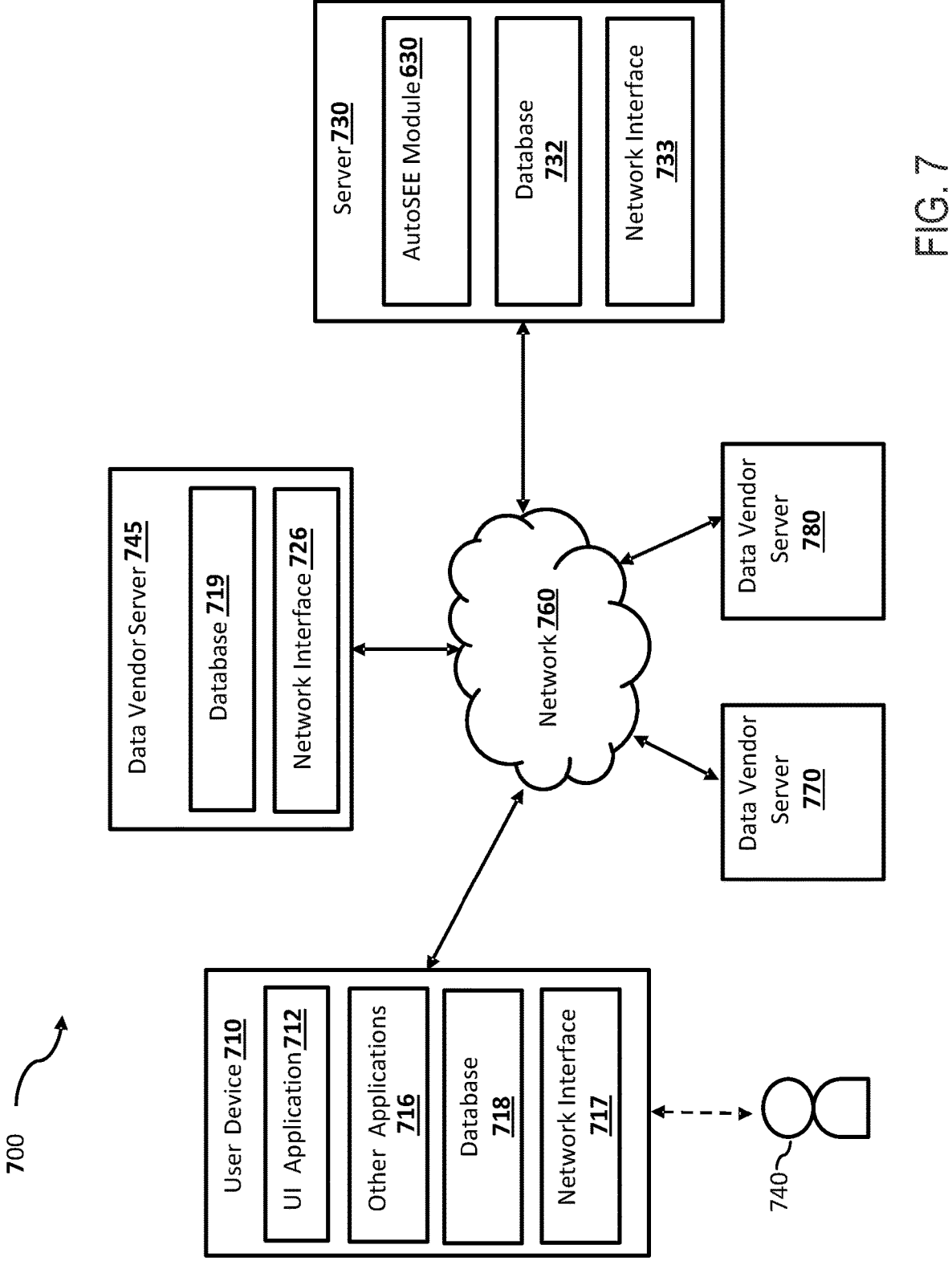
FIG. 7 is a simplified block diagram of a networked system suitable for implementing the framework described in FIGS. 1-6 and other embodiments described herein.

FIG. 7 is a simplified block diagram of a networked system suitable for implementing the AutoSEE framework described in FIGS. 1-5 and other embodiments described herein. In one embodiment, block diagram 700 shows a system including the user device 710 which may be operated by user 740, data vendor servers 745, 770 and 780, server 730, and other forms of devices, servers, and/or software components that operate to perform various methodologies in accordance with the described embodiments. Exemplary devices and servers may include device, stand-alone, and enterprise-class servers which may be similar to the computing device 600 described in FIG. 6, operating an OS such as a MICROSOFT® OS, a UNIX® OS, a LINUX® OS, or other suitable device and/or server-based OS. It can be appreciated that the devices and/or servers illustrated in FIG. 7 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 710, data vendor servers 745, 770 and 780, and the server 730 may communicate with each other over a network 760. User device 710 may be utilized by a user 740 (e.g., a driver, a system admin, etc.) to access the various features available for user device 710, which may include processes and/or applications associated with the server 730 to receive an output data anomaly report.

User device 710, data vendor server 745, and the server 730 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 700, and/or accessible over network 760.

User device 710 may be implemented as a communication device that may utilize appropriate hardware and software configured for wired and/or wireless communication with data vendor server 745 and/or the server 730. For example, in one embodiment, user device 710 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 710 of FIG. 7 contains a user interface (UI) application 712, and/or other applications 716, which may correspond to executable processes, procedures, and/or applications with associated hardware. For example, the user device 710 may receive a message indicating a sequential recommendation from the server 730 and display the message via the UI application 712. In other embodiments, user device 710 may include additional or different modules having specialized hardware and/or software as required.

In various embodiments, user device 710 includes other applications 716 as may be desired in particular embodiments to provide features to user device 710. For example, other applications 716 may include security applications for implementing client-side security features, programmatic client applications for interfacing with appropriate application programming interfaces (APIs) over network 760, or other types of applications. Other applications 716 may also include communication applications, such as email, texting, voice, social networking, and IM applications that allow a user to send and receive emails, calls, texts, and other notifications through network 760. For example, the other application 716 may be an email or instant messaging application that receives a prediction result message from the server 730. Other applications 716 may include device interfaces and other display modules that may receive input and/or output information. For example, other applications 716 may contain software programs for asset management, executable by a processor, including a graphical user interface (GUI) configured to provide an interface to the user 740 to view outputs of the sequential recommendation model.

User device 710 may further include database 718 stored in a transitory and/or non-transitory memory of user device 710, which may store various applications and data and be utilized during execution of various modules of user device 710. Database 718 may store user profile relating to the user 740, predictions previously viewed or saved by the user 740, historical data received from the server 730, and/or the like. In some embodiments, database 718 may be local to user device 710. However, in other embodiments, database 718 may be external to user device 710 and accessible by user device 710, including cloud storage systems and/or databases that are accessible over network 760.

User device 710 includes at least one network interface component 717 adapted to communicate with data vendor server 745 and/or the server 730. In various embodiments, network interface component 717 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 745 may correspond to a server that hosts database 719 to provide training datasets including user behavior sequences to the server 730. The database 719 may be implemented by one or more relational database, distributed databases, cloud databases, and/or the like.

The data vendor server 745 includes at least one network interface component 726 adapted to communicate with user device 710 and/or the server 730. In various embodiments, network interface component 726 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 745 may send asset information from the database 719, via the network interface 726, to the server 730.

The server 730 may be housed with the AutoSEE module 630 and its submodules described in FIG. 1. In some implementations, module 630 may receive data from database 719 at the data vendor server 745 via the network 760 to generate a sequential recommendation model. The generated sequential recommendation model and/or its outputs may also be sent to the user device 710 for review by the user 740 via the network 760.

The database 732 may be stored in a transitory and/or non-transitory memory of the server 730. In one implementation, the database 732 may store data obtained from the data vendor server 745. In one implementation, the database 732 may store parameters of the AutoSEE module 630. In one implementation, the database 732 may store previously generated parameters, and the corresponding input feature vectors.

In some embodiments, database 732 may be local to the server 730. However, in other embodiments, database 732 may be external to the server 730 and accessible by the server 730, including cloud storage systems and/or databases that are accessible over network 760.

The server 730 includes at least one network interface component 733 adapted to communicate with user device 710 and/or data vendor servers 745, 770 or 780 over network 760. In various embodiments, network interface component 733 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 760 may be implemented as a single network or a combination of multiple networks. For example, in various embodiments, network 760 may include the Internet or one or more intranets, landline networks, wireless networks, and/or other appropriate types of networks. Thus, network 760 may correspond to small scale communication networks, such as a private or local area network, or a larger scale network, such as a wide area network or the Internet, accessible by the various components of system 700.

FIGS. 8-13 provide example tables illustrating example performance of different summarization models and training methods discussed herein. Results are exemplary, and are based on specific training data, hyper parameter selections, etc. which only represent some embodiments of the systems and methods described herein. Results illustrate, however, the improvement that may be made in predictions, and also reduction in computer resources.

FIG. 8 illustrates overall performance comparisons among different baselines. For each metric, the best score of the illustrated methods is in bold, and the best scores in the baselines are underlined. As shown in FIG. 8, AutoSEE was compared against eight baselines on four datasets. AutoSEE outperformed existing methods in three of four datasets by a large margin. The average improvement over 4 random seeds compared with the best baseline are up to 48.89% in terms of hit ratio (HR) at specified k values (HR@k) and normalized discounted cumulative gain (NDCG) at specified k values (NDCG@k). HR is a measure of the fraction of users for which a correct prediction is in the top k predictions of the model. NDCG also measures the top k predictions of a model, but discounts items ranked lower in the prediction, and compares the prediction rankings to an ideal prediction.

AutoSEE was compared against a number of alternative sequential recommendation models, including models aimed at eliminating similar issues such as data sparsity and noisy data. NCF as described in He et al., Neural collaborative filtering, Proceedings of the 26th international conference on world wide web, p. 173-182, 2017. GRU4Rec as described in Hidasi et al., Session-based recommendations with recurrent neural networks, arXiv 1511.06939, 2015. SASRec as described in Kang and McAuley, Self-attentive sequential recommendation, ICDM, p. 197-206, 2018. T-SCE as described in Wang et al., Denoising implicit feedback for recommendation, Proceedings of the 14th ACM international conference on web search and data mining, p. 373-381, 2021. S³-Rec as described in Zhou et al., Self-supervised learning for sequential recommendation with mutual information maximization, Proceedings of the 29th ACM International Conference on Information & Knowledge Management, p. 1893-1902, 2020. CL4SRec as described in Xie et al., Contrastive learning for sequential recommendation, arXiv:2010.14395, 2020. MMInfoRec as described in Qiu et al., Memory augmented multi-instance contrastive predictive coding for sequential recommendation, arXiv:2109.00368, 2021.

Among normally trained models (NCF, GRU4Rec, and SASRec), SASRec performs best. NCF as a non-sequential model, achieves the worst performance. Models trained with the consideration of alleviating data-sparsity issues (S3-Rec, CL4SRec, and MMInfoRec) outperform models with standard training (NCF, GRU4Rec, and SAS-Rec) in most evaluation metrics. This phenomenon demonstrates the benefits of addressing data-sparsity issues for improving model learning signal. MMInfoRec achieves the best results on Yelp in terms of HR@5 and NDCG@5, demonstrates the benefits of the contrastive learning paradigm. T-SCE outperforms SASRec, shows the benefits of data de-noise.

Figure 9:
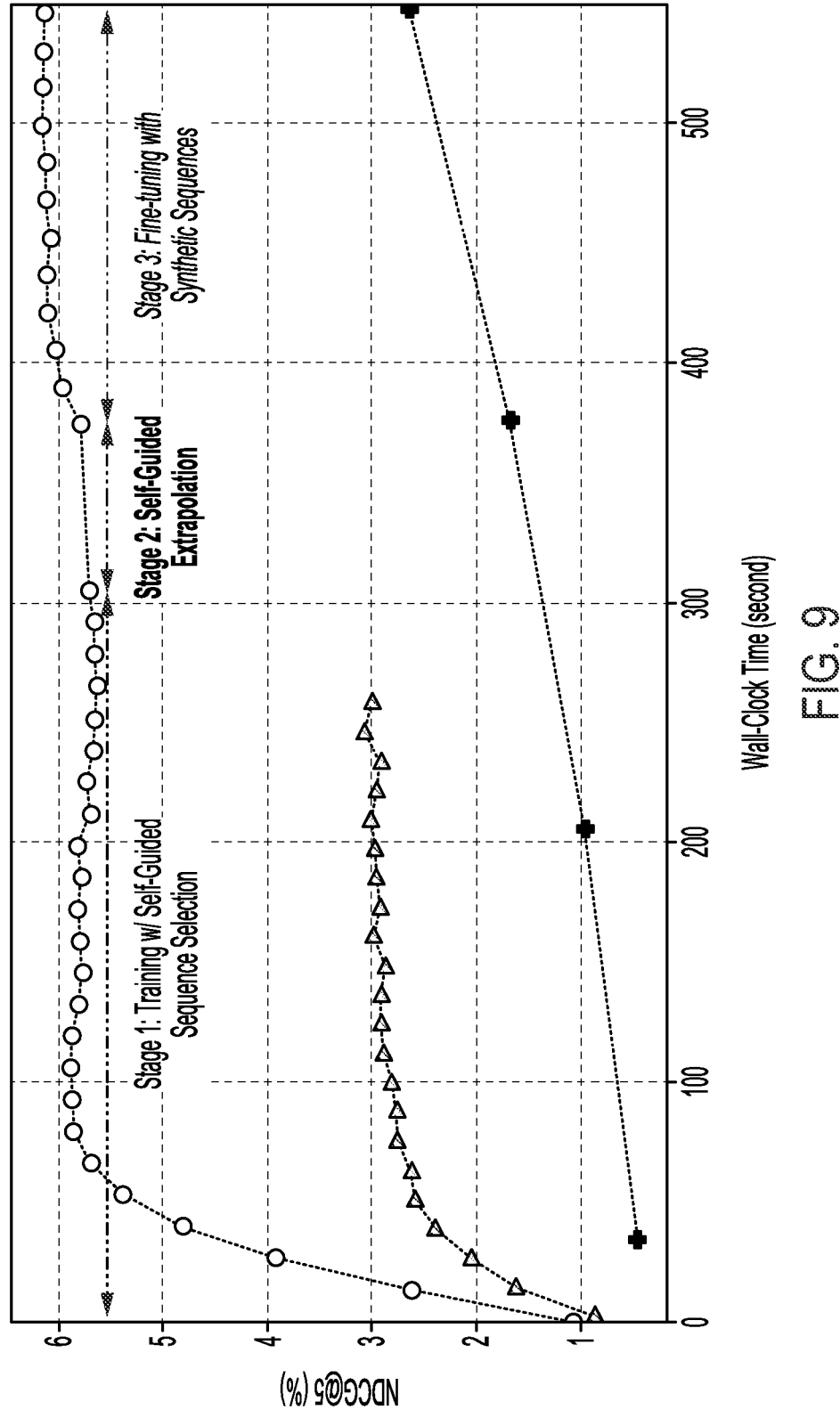

FIG. 9 illustrates a comparison of the training efficiency on rich sequences, with performance based on a validation set using NDCGG@5 as the metric, plotted with respect to wall-clock time. Compared with SASRec, AutoSEE can converge to a better performance and performs better at all wall clock times. This demonstrates that DQ-Score guided sequence selection can help the model learn adaptively and concentrate on meaningful samples thus improving learning. It is worth noting that, the best performing baseline MMInfoRec is an order of magnitude slower than AutoSEE because of its auxiliary contrastive learning framework, and it also takes more than 4 times as much memory compared to AutoSEE to store additional positive/negative sequences. Note further that for this dataset which has a rich amount of data, most of the benefit is realized in the first stage, using DQ-score guided sampling, with a smaller improvement due to fine-tuning using synthetic sequences. This illustrates that DQ-score guided sampling may be used by itself for significant improvements and may be further improved upon by using a meta-extrapolator, even when starting with rich datasets.

Figure 10:
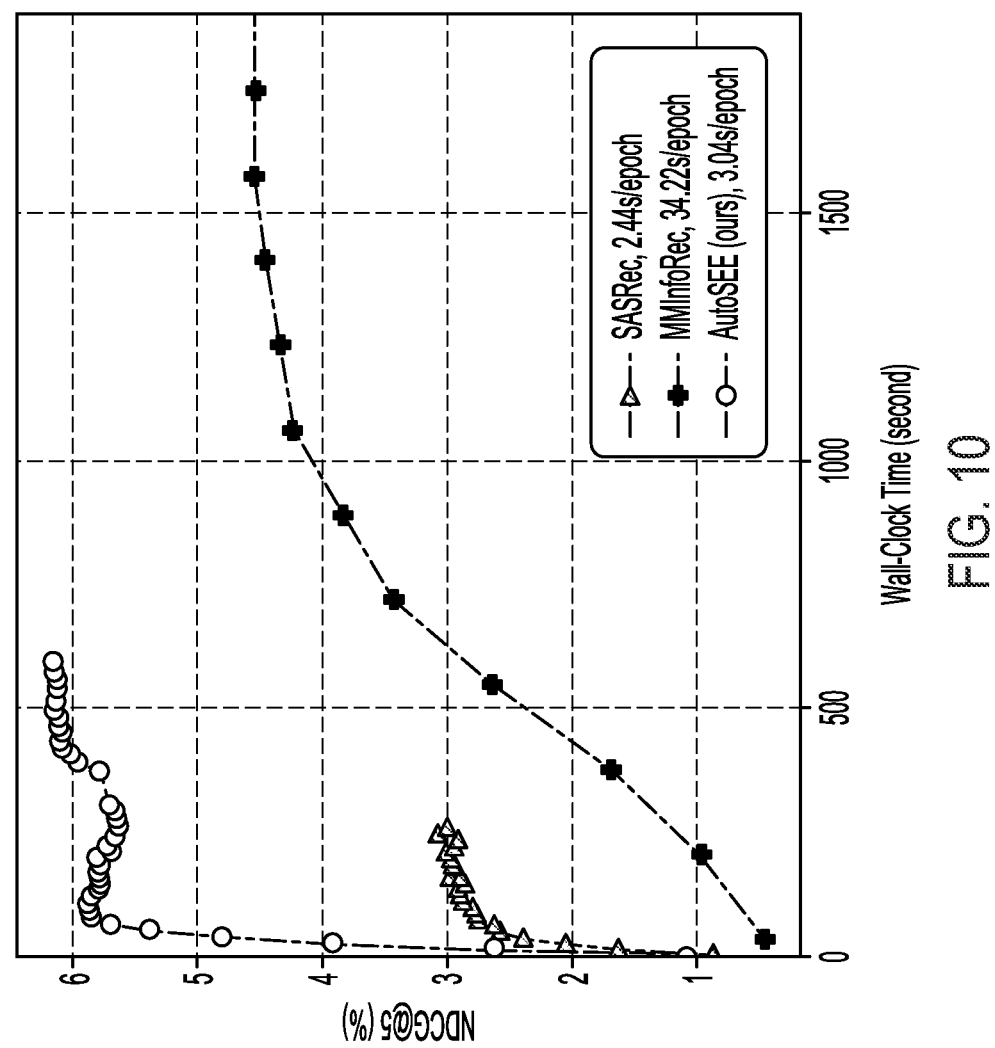

FIG. 10 is a zoomed-out perspective of the same performance chart as FIG. 9. FIG. 10 shows that even given significant training time, the alternative models converge to a lower performance than AutoSEE.

FIG. 11 illustrates performance of AutoSEE in a scenario where the training dataset is scarce, in which the recommender system only has few user behavior sequences for training. To simulate the scenario, a subset of a "beauty" dataset were selected. As shown, the self-guided sequence extrapolation component (i.e., use of the meta-extrapolator) of AutoSEE is especially useful when sequences are scarce in the system. Training with 10% original sequences leads to 61.04% performance degradation. While with additional generated synthetic sequences, the performance only has a 20.67% drop. In other words, AutoSEE helps improve the recommendation performance under a scarce sequences setting.

FIGS. 12A-12D illustrate performance of AutoSEE on noisy sequences. Comparisons were made between Auto-SEE with and without self-Experiments were conducted on a "beauty" dataset and an ML-1M dataset, which consists of 1 million movie ratings. To simulate noisy sequences, 50% of the sequences were randomly selected and a certain proportion (i.e., 10%, 30%, 50%) of items in the sequences were replaced with negative items (items the user did not interact with). FIGS. 12A and 12B show the performance with respect to the percentage of noisy interactions in a sequence. FIGS. 12C and 12D show the performance with respect to percentage of sequences that contain noisy interactions. As shown, under each scenario AutoSEE outperforms the model without self-guided sequence selection.

FIG. 13 illustrates relative performance of AutoSEE with different features excluded/included in order to illustrate the relative contribution of different aspects. Comparisons are made to baseline SASRec based models using HR and NDCG metrics, using beauty and Yelp datasets. As shown, AutoSEE with only DQ score guided sampling without extrapolated sequences outperforms SASRec. Further, sampling guided by only either D score or Q score alone also outperforms. The best performing model, however, includes full AutoSEE with DQ score guided sampling and extrapolated synthetic sequences. Specifically, we verify that DQ-Score guided sampling can help learn a better performed model than training with randomly sampled data. Besides, the learnt Meta-Extrapolator can generate informative synthetic user behavior sequences that can help further improve recommendation performance. The DQ-Score is also superior to D-score and Q-score for characterizing the importance of sequences.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method for training a sequential recommendation model to automatically generate a sequential recommendation of multiple items in a sequence to a user, comprising:

receiving, via a communication interface, a training dataset comprising a plurality of user behavior sequences;

augmenting the training dataset with a plurality of synthetic user behavior sequences generated by a trained extrapolator based on a subset of user behavior sequences of the plurality of user behavior sequences;

determining, via a DQ score generator, for at least one user behavior sequence from the training dataset:

a difficulty score with an inverse relation to a probability of a sequential recommendation model with a first set of parameters correctly recommending an item in the at least one user behavior sequence, and a quality score based on a first prediction generated by the sequential recommendation model with the first set of parameters from the at least one user behavior sequence;

determining, via the DQ score generator, a respective combined difficulty and quality (DQ) score for each of the plurality of user behavior sequences based on the respective difficulty and quality scores;

sampling one or more user behavior sequences from the plurality of user behavior sequences with a probability proportional to the respective DQ scores;

generating, by the sequential recommendation model, a second prediction from the sampled one or more user behavior sequences;

training a sequence encoder of the sequential recommendation model in multiple stages, including:

training the sequence encoder of the sequential recommendation model based on a training objective to minimize a loss computed via a noise contrastive estimation (NCE) module, wherein the loss is based on a comparison of the second prediction against a ground truth, corresponding to the sampled one or more user behavior sequences, and a noise distribution, resulting in a second set of parameters of the sequential recommendation model;

updating the respective combined DQ score for each of the plurality of user behavior sequences based on the sequential recommendation model with the second set of parameters; and training the sequence encoder of the sequential recommendation model with the second set of parameters utilizing the updated respective combined DQ score for each of the plurality of user behavior sequences, resulting in a third set of parameters of the sequential recommendation model; and generating, by the trained sequential recommendation model with the third set of parameters integrated at a recommender system, a next recommended item predicted based on an input user behavior sequence received via a user interface; and displaying, via the user interface, the next recommended item.

2. The method of claim 1, wherein the difficulty score of the at least one user behavior sequence is based on an accuracy of next-item predictions of the sequential recommendation model for the at least one user behavior sequence.

3. The method of claim 1, wherein the difficulty score of the at least one user behavior sequence is combined with a previous difficulty score of the at least one user behavior sequence.

4. The method of claim 1, wherein the quality score of the at least one user behavior sequence is based on a measure of variance of prediction scores of the sequential recommendation model across items in the at least one user behavior sequence.

5. The method of claim 1, wherein the quality score of the at least one user behavior sequence is combined with a previous quality score of the at least one user behavior sequence.

6. The method of claim 1, wherein the determining the respective combined DQ score of the at least one user behavior sequence comprises summing a square of the difficulty score with a square of the quality score.

7. The method of claim 6, wherein the determining the respective combined DQ score of the at least one user behavior sequence further comprises raising the sum of the squares to a predetermined power.

8. The method of claim 1, wherein the determining the respective combined DQ score the at least one user behavior sequence comprises weighting the difficulty score and the quality score differently.

9. The method of claim 1, wherein the difficulty score and the quality score are iteratively updated based on the trained sequential recommendation model.

10. A system for automatically generating a sequential recommendation of multiple items in a sequence to a user, comprising:

a memory that stores a sequential recommendation model;

a communication interface that receives a plurality of user behavior sequences; and one or more hardware processors that:

receives, via the communication interface, a training dataset comprising a plurality of user behavior sequences;

augments the training dataset with a plurality of synthetic user behavior sequences generated by a trained extrapolator based on a subset of user behavior sequences of the plurality of user behavior sequences;

determines, via a DQ score generator for at least one user behavior sequence from the training dataset:

a difficulty score with an inverse relation to a probability of a sequential recommendation model with a first set of parameters correctly recommending an item in the at least one user behavior sequence, and a quality score based on predictions of the sequential recommendation model with the first set of parameters;

determines, via the DQ score generator a respective combined difficulty and quality (DQ) score for each of the plurality of user behavior sequences based on the respective difficulty and quality scores;

samples one or more user behavior sequences from the plurality of user behavior sequences with a probability proportional to the respective DQ scores;

trains a sequence encoder of the sequential recommendation model in multiple stage, including:

training the sequence encoder of the sequential recommendation model based on a training objective to minimize a loss computed via a noise contrastive estimation (NCE) module, wherein the loss is based on a comparison of predictions generated by the sequential recommendation model against a ground-truth from the sampled one or more user behavior sequences, and a noise distribution, resulting in a second set of parameters of the sequential recommendation model, updating the respective combined DQ score for each of the plurality of user behavior sequences based on the sequential recommendation model with the second set of parameters, and training the sequence encoder of the sequential recommendation model with the second set of parameters utilizing the updated respective combined DQ score for each of the plurality of user behavior sequences, resulting in a third set of parameters of the sequential recommendation model;

generates by the trained sequential recommendation model with the third set of parameters integrated with a recommender system, a next recommended item predicted based on an input user behavior sequence received via a user interface; and displaying, via the user interface, the next recommended item.

11. The system of claim 10, wherein the difficulty score of the at least one user behavior sequence is based on an accuracy of next-item predictions of the sequential recommendation model for the at least one user behavior sequence.

12. The system of claim 10, wherein the difficulty score of the at least one user behavior sequence is combined with a previous difficulty score of the at least one user behavior sequence.

13. The system of claim 10, wherein the quality score of the at least one user behavior sequence is based on a measure of variance of prediction scores of the sequential recommendation model across items in the at least one user behavior sequence.

14. The system of claim 10, wherein the quality score of the at least one user behavior sequence is combined with a previous quality score of the at least one user behavior sequence.

15. The system of claim 10, wherein the determining the respective combined DQ score of the at least one user behavior sequence comprises summing a square of the difficulty score with a square of the quality score.

16. The system of claim 15, wherein the determining the respective combined DQ score of the at least one user behavior sequence further comprises raising the sum of the squares to a predetermined power.

17. The system of claim 10, wherein the determining the respective combined DQ score the at least one user behavior sequence comprises weighting the difficulty score and the quality score differently.

18. A non-transitory machine-readable medium comprising a plurality of machine-executable instructions which, when executed by one or more processors, are adapted to cause the one or more processors to perform operations comprising:

receiving, via a communication interface, a training dataset comprising a plurality of user behavior sequences;

determining, for at least one user behavior sequence from the training dataset:

a difficulty score with an inverse relation to a probability of a sequential recommendation model with a first set of parameters correctly recommending an item in the at least one user behavior sequence, and a quality score based on a first prediction generated by the sequential recommendation model with the first set of parameters;

determining a first set of difficulty and quality (DQ) scores based on a combination of the difficulty score and the quality score, corresponding to the plurality of user behavior sequences, respectively;

training a sequence encoder of the sequential recommendation model in multiple stages, including:

updating a first set of parameters of the sequence encoder of the sequential recommendation model based on a training objective to minimize a loss computed via a noise contrastive estimation (NCE) module, wherein the loss is based on a comparison of predictions generated by the sequential recommendation model against a ground-truth from the plurality of user behavior sequences sampled based on respective DQ scores of the first set of DQ scores, and a noise distribution, resulting in a second set of parameters of the sequential recommendation model, determining a second set of DQ scores based on the sequential recommendation model with the second set of parameters, and updating the second set of parameters of the sequential recommendation utilizing the second set of DQ scores, resulting in a third set of parameters of the sequential recommendation model;

selecting a first subset of user behavior sequences and a second subset of user behavior sequences from the plurality of user behavior sequences based on the second set of DQ scores;

training an extrapolator using the first subset of user behavior sequences;

generating, by the trained extrapolator, a plurality of synthetic user behavior sequences based on the second subset of user behavior sequences; and training the sequence encoder of the sequential recommendation model using user behavior sequences sampled from the training dataset with a probability proportional to respective DQ scores of the second set of DQ scores;

fine-tuning the sequence encoder of the sequential recommendation model using the plurality of synthetic user behavior sequences;

generating, by the fine-tuned recommendation model, a next recommended item predicted based on an input user behavior sequence received via a user interface; and displaying, via the user interface, the next recommended item.

19. The non-transitory machine-readable medium of claim 18, wherein the first subset of user behavior sequences includes user behavior sequences with a respective quality score above a first predetermined threshold, and a respective difficulty score below a second predetermined threshold.

20. The non-transitory machine-readable medium of claim 18, wherein the second subset of user behavior sequences includes user behavior sequences with a respective quality score above a first predetermined threshold, and a respective difficulty score above a second predetermined threshold.

* * * * *